United States Patent
Kawashima

(10) Patent No.: US 10,216,953 B2
(45) Date of Patent: Feb. 26, 2019

(54) CONTROL METHOD OF IMAGE COMMUNICATION APPARATUS FOR PREVENTING THE DISCLOSURE OF ADDRESS BOOK DATA TO AN APPARATUS TO WHICH THE ADDRESS BOOK DATA IS TO BE EXPORTED

(71) Applicant: CANON KABUSHIKI KAISHA, Tokyo (JP)

(72) Inventor: Yasuaki Kawashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/228,112

(22) Filed: Mar. 27, 2014

(65) Prior Publication Data
US 2014/0298417 A1 Oct. 2, 2014

(30) Foreign Application Priority Data
Apr. 1, 2013 (JP) ................. 2013-075963

(51) Int. Cl.
G06F 21/31 (2013.01)
G06F 21/62 (2013.01)
G06Q 10/10 (2012.01)

(52) U.S. Cl.
CPC ....... G06F 21/6227 (2013.01); G06Q 10/107 (2013.01); G06F 2221/2149 (2013.01)

(58) Field of Classification Search
CPC ..... H04L 9/32–9/3297; H04L 63/04–63/0492; G06F 21/30–21/46; G06F 21/60–21/645; G06F 21/6227; G06F 2221/2149; G06F 21/6218; G06Q 10/107
USPC ................... 726/3.28, 3, 28, 2, 27
See application file for complete search history.

(56) References Cited

U.S. PATENT DOCUMENTS

| | | | | |
|---|---|---|---|---|
| 2009/0070583 A1* | 3/2009 | von Mueller | ........ | G06Q 20/085 713/168 |
| 2009/0259493 A1* | 10/2009 | Venon | ........ | G06F 19/3418 705/3 |
| 2010/0306519 A1* | 12/2010 | Buonpane | ........ | G06F 21/79 713/2 |
| 2011/0252366 A1* | 10/2011 | Balasubramanian | .. | G06Q 10/10 715/809 |
| 2014/0012813 A1* | 1/2014 | Oh | ........ | G06Q 10/109 707/635 |
| 2015/0113664 A1* | 4/2015 | Aad | ........ | G06K 9/00288 726/27 |

FOREIGN PATENT DOCUMENTS

JP 2007-081578 A 3/2007

* cited by examiner

*Primary Examiner* — Ashokkumar B Patel
*Assistant Examiner* — Quazi Farooqui
(74) *Attorney, Agent, or Firm* — Canon U.S.A., Inc. I.P. Division

(57) ABSTRACT

An image communication apparatus includes a storage unit including a shared address book area and an individual address book area, a communication unit configured to receive an import file including shared address book data shared among a plurality of users or private address book data limiting users who can utilize the data, and a CPU, and if the import file includes the private address book data and the shared address book area is designated as an import destination, the CPU warns the user that the private address book data may be shared and prevents the user from importing the import file.

6 Claims, 17 Drawing Sheets

FIG.9

AddressSource Private (UserA)

FIG.15

| USER ID FOR IMAGE COMMUNICATION APPARATUS: USER 1 | | |
|---|---|---|
| ADDRESS INFORMATION | IDENTIFIER | PASSWORD INFORMATION |
| ¥¥192.168.0.1¥Dir1 | ShareUser1 | SharePassWord1 |
| ¥¥192.168.0.2¥Dir2 | ShareUser2 | SharePassWord2 |
| ¥¥192.168.0.3¥Dir3 | LocalAccount3 | LocalPassWord3 |

CONTROL METHOD OF IMAGE COMMUNICATION APPARATUS FOR PREVENTING THE DISCLOSURE OF ADDRESS BOOK DATA TO AN APPARATUS TO WHICH THE ADDRESS BOOK DATA IS TO BE EXPORTED

BACKGROUND OF THE INVENTION

Field of the Invention

The present invention relates to a data export/import technique of an image communication apparatus such as a multifunction peripheral or a fax machine.

Description of the Related Art

Generally, image communication apparatuses store various types of data associated with communication. Such data includes, for example, address book data including address information of fax machines and other electronic apparatuses as well as data for network settings. If an image communication apparatus is used by a plurality of users, the address book data can be managed by each user. In such a case, it is possible to cause the image communication apparatus to manage the address book data divided into address book data which can be disclosed to and shared by a plurality of users and address book data used by specific users.

As one method, when a new image communication apparatus is added, the address book data is distributed from the existing image communication apparatus to the new image communication apparatus or via an external apparatus. When the address book data is distributed, import/export of the address book data is performed between the image communication apparatuses. However, not all the image communication apparatuses support the management of address book data in each user. For example, even if the image communication apparatus which exports the address book data supports the management of the address book data for each user, the image communication apparatus which imports the address book data may not support the management of the address book data for each user. In such a case, the address information in the address book data which is limited only to specific users may be disclosed.

Japanese Patent Application Laid-Open No. 2007-81578 discusses an invention of an image communication apparatus configured to export address book data only when an image communication apparatus which imports the address book data is capable of managing the address book data for each user. Since the import operation is permitted only when the address book data can be managed for each user, it is possible to prevent the address information of the address book data which is not available to all users from being disclosed.

Meanwhile, imported/export of address book data is not always directly performed between the image communication apparatuses. For example, importing/exporting of the address book data is also conceivable, in which one image communication apparatus exports the address book data to a transportable media and the other image communication apparatus imports the exported address book data from the transportable media. This method is especially useful when the address book data stored in one image communication apparatus is used by a plurality of image communication apparatuses. However, it is not possible to directly apply the image communication apparatus discussed in Japanese Patent Application Laid-Open No. 2007-81578 to this case, in which the image communication apparatus exporting the address book data determines whether the image communication apparatus importing the address book data can manage the address book data for each user.

SUMMARY OF THE INVENTION

The present invention is directed to provide a technique for preventing the disclosure of address book data managed in each user and limited to use by a specific user, to an apparatus to which the data is to be exported.

According to an aspect of the present invention, a control method for an image communication apparatus is executed by a first image communication apparatus and a second image communication apparatus. The first image communication apparatus is configured to output shared address book data including address information of a destination where image data is to be transmitted and shared among a plurality of users and private address book data limiting users who can utilize the data, and the second image communication apparatus has a storage unit including a shared area which is a storage area of data shared among the plurality of users and a private area which is a storage area of data limiting users who can utilize the data, and stores the shared address book data and the private address book data output from the first image communication apparatus in the storage unit. According to the method, the first image communication apparatus generates an export file including the shared address book data or the private address book data, and adds, to the export file which has been generated, type data indicating which of the shared address book data and the private address book data is included in the export file.

According to another aspect of the present invention, the second image communication apparatus includes accepting designation indicating which of the shared area and the private area is an import destination of the export file, determining whether the export file includes either of the shared address book data and the private address book data according to the type data added to the export file, if the export file includes the shared address book data, writing the shared address book data in the import destination which has been designated, if the export file includes the private address book data and the private area is designated as the import destination, writing the private address book data in the private area, and if the export file includes the private address book data and the shared area is designated as the import destination, warning the user that the private address book data will be shared.

Further features of the present invention will become apparent from the following description of exemplary embodiments with reference to the attached drawings.

BRIEF DESCRIPTION OF THE DRAWINGS

FIG. 9 illustrates an example of a header added to an export file.

FIG. 15 illustrates an example of a key ring table.

DESCRIPTION OF THE EMBODIMENTS

Various exemplary embodiments, features, and aspects of the invention will be described in detail below with reference to the drawings.

Figure 1:
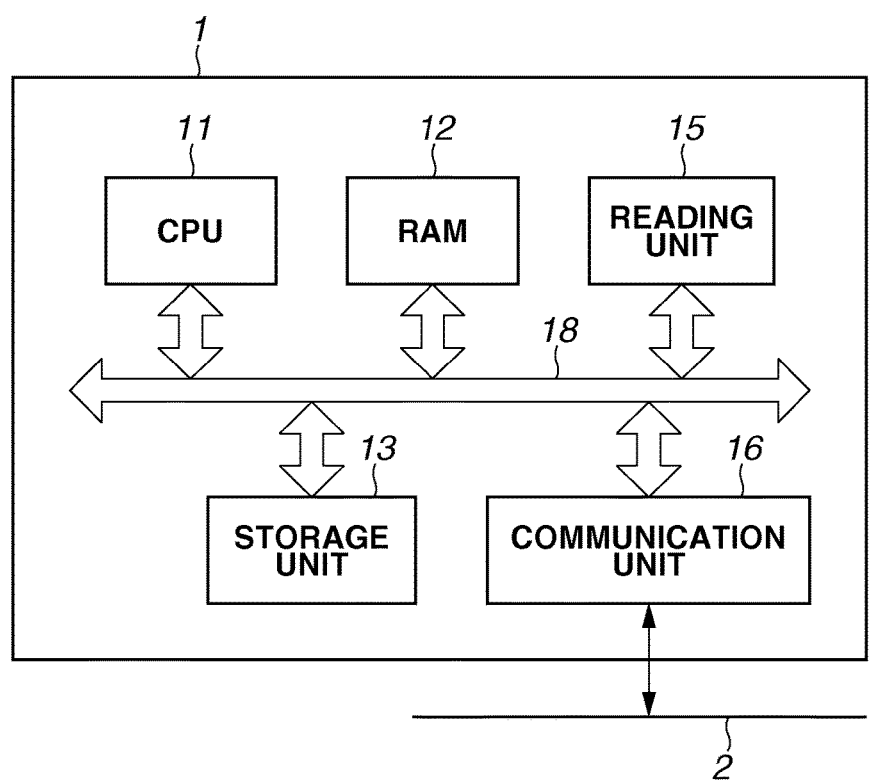
FIG. 1 illustrates a hardware configuration of an image communication apparatus.

A first exemplary embodiment will be described. FIG. 1 illustrates a hardware configuration of an image communication apparatus according to the present embodiment. An image communication apparatus 1 includes a central processing unit (CPU) 11, a random access memory (RAM) 12, a storage unit 13, a reading unit 15, and a communication unit 16. These components are data-communicably connected via a bus 18.

The CPU 11 which uses the RAM 12 as a work area reads out and executes various programs stored in the storage unit 13 to control the entire operation of the image communication apparatus 1. Especially, the CPU 11 executes a program to import and export address book data including address information. In addition to the above-described program, the storage unit 13 stores address data book to be exported, authentication information of a user who can use the image communication apparatus 1, and various types of setting data of the image communication apparatus 1. The imported address book data is stored in the storage unit 13.

The reading unit 15 having a scanner function optically reads and converts a document into image data. The communication unit 16 performs communication with an external device via a network 2. If the image communication apparatus 1 functions as a network scanner or a fax machine, the image data of the document read by the reading unit 15 is transmitted to the external device. Further, when the communication unit 16 exports/imports the address book data, it transmits/receives the address book data. The CPU 11 controls the operation of each unit of the image communication apparatus 1 for a series of the above-mentioned operations.

Figure 2:
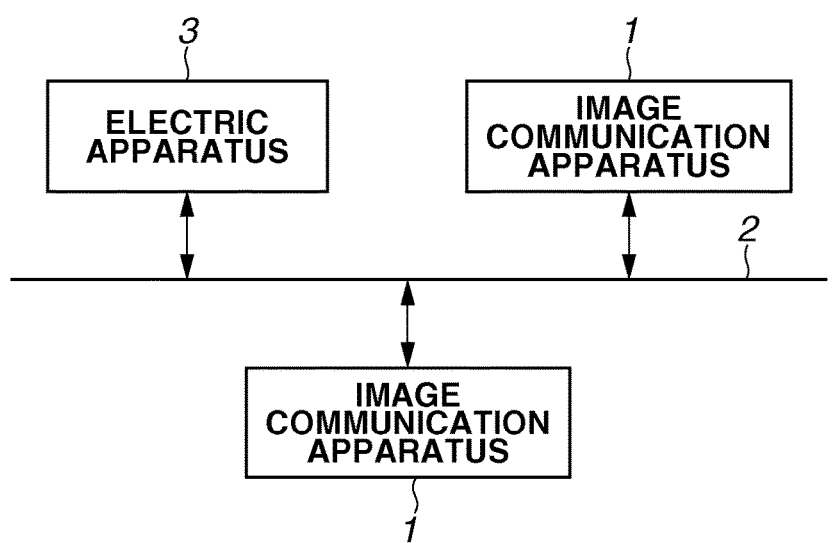
FIG. 2 illustrates a configuration example of a data distribution system.

FIG. 2 illustrates a configuration example of a data distribution system including the image communication apparatus 1. The image communication apparatus 1 is data-communicably connected to another image communication apparatus 1 and an electronic apparatus 3 via the network 2. The electronic apparatus 3, which is an information processing apparatus such as a personal computer, can access a remote user interface (remote UI) of the image communication apparatus 1 using a hypertext transfer protocol (HTTP). For that purpose, the electronic apparatus 3 includes a display device and an input device, and can remotely control the image communication apparatus 1 using these devices.

When distributing address book data from a first image communication apparatus 1 to a second image communication apparatus 1, the first image communication apparatus 1 serves as an export apparatus which exports address book data, and the second image communication apparatus 1 serves as an import apparatus which imports the exported address book data. Further, the exported address book data can be temporarily stored in the electronic apparatus 3, and then imported from the electronic apparatus 3. Further, the first image communication apparatus 1 can export the address book data to a transportable medium (not illustrated, while the second image communication apparatus 1 can import the exported address book data.

Figure 3:
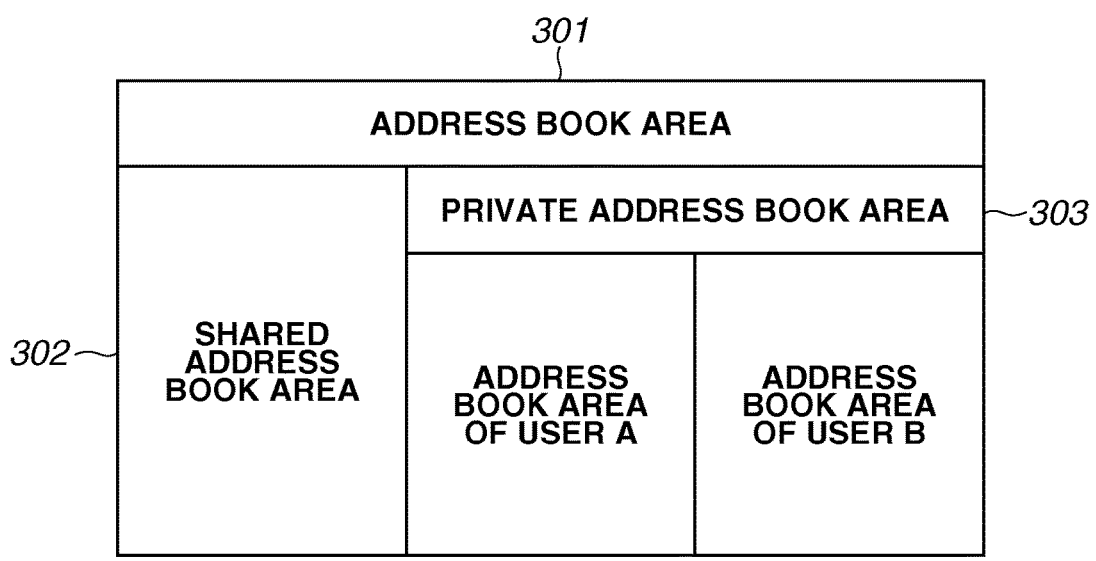
FIG. 3 illustrates an example of an address book area.

FIG. 3 illustrates an example of an address book area 301 which is a storage area where the address book data is stored in the storage unit 13. The address book area 301 is provided with a shared address book area 302 and a private address book area 303.

The shared address book area 302 is a shared area where address book data which can be shared by a plurality of users of the image communication apparatus 1 (hereinafter referred to as "shared address book data") is stored. The private address book area 303 is a private area where address book data which only a specified user can use (hereinafter referred to as "private address book data") is stored. According to the example in FIG. 3, private address book data including address information individually used by a user A is stored in an address book area of the user A. Similarly, private address book data including address information individually used by a user B is stored in an address book area of the user B. Address information included in the address book data which can be individually used by a specified user includes an identifier and a password. The identifier and password are authentication information used when authenticating the user in the apparatus (i.e., another image communication apparatuses or an electronic apparatus) identified by the address information.

If the image communication apparatus 1 functions as a network scanner or a fax machine, image data of a document read by the reading unit 15 is transmitted to an apparatus designated by the address information included in the shared address book data and the private address book data.

Figure 4:
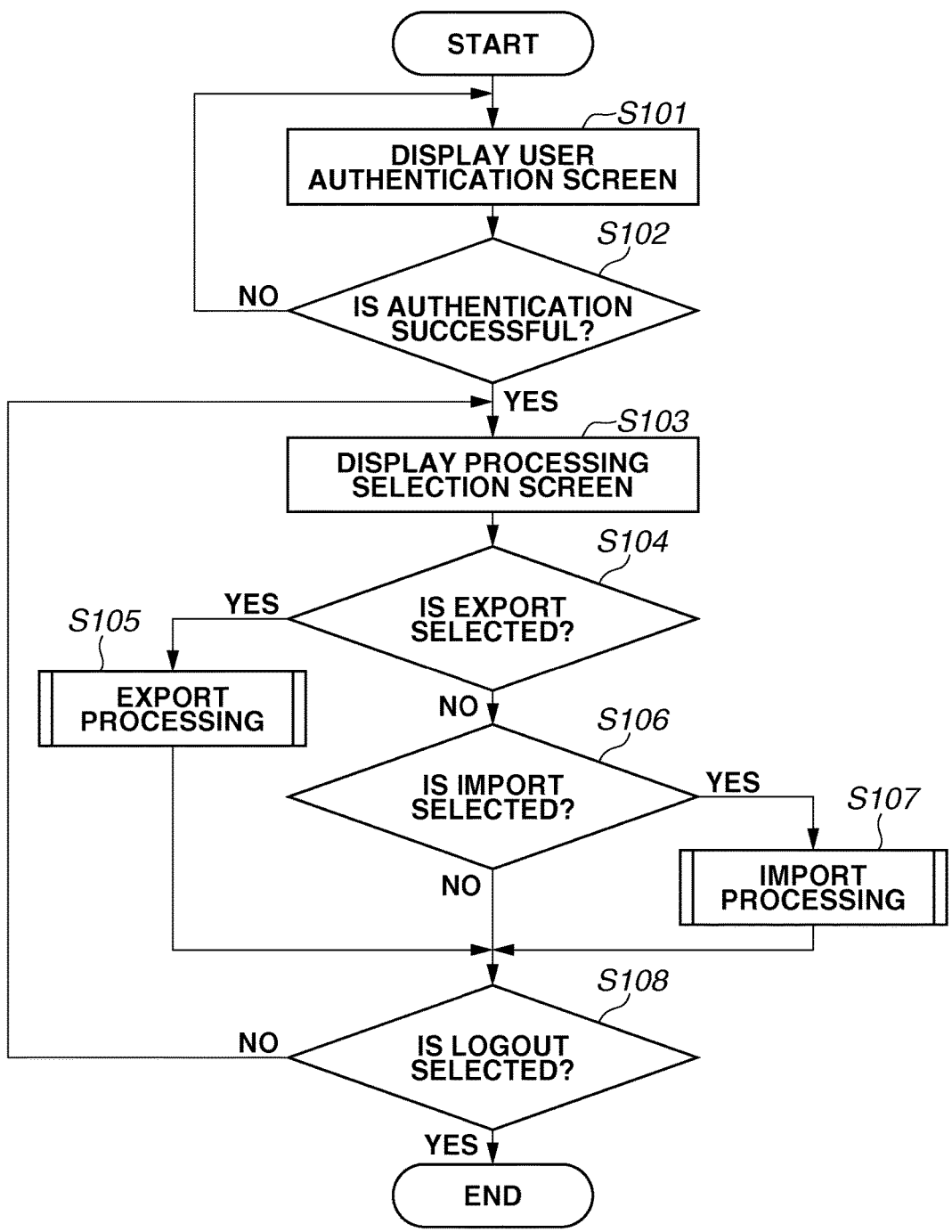
FIG. 4 is a flowchart illustrating export/import processing of the address book data.

FIG. 4 is a flowchart illustrating the export/import processing of the address book data performed by the image communication apparatus 1, which is operated by the user via the remote UI.

Figure 5:
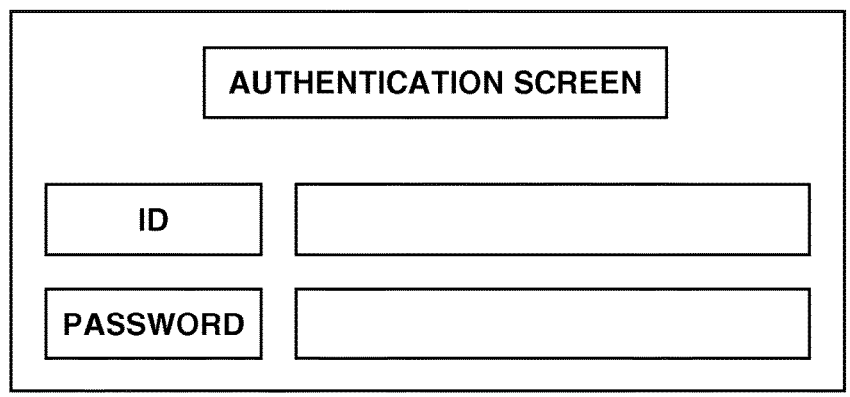
FIG. 5 illustrates an example of an authentication screen.

In step S101, if the electronic apparatus 3 accesses the image communication apparatus 1 via the remote UI after the image communication apparatus 1 is started, the CPU 11 of the image communication apparatus 1 causes the display device of the electronic apparatus 3 to display a UI screen such as the one illustrated in FIG. 5. This UI screen is an authentication screen displayed for the image communication apparatus 1 to authenticate. A registered user of the image communication apparatus 1 enters identification (ID) and a password for personal identification. In step S102, the CPU 11 authenticates the user based on the ID and the password entered via the authentication screen, and further determines whether the authentication is successful. If the authentication is successful (YES in step S102), the processing proceeds to step S103. If the authentication fails (NO in step S102), the processing returns to step S101.

Figure 6:
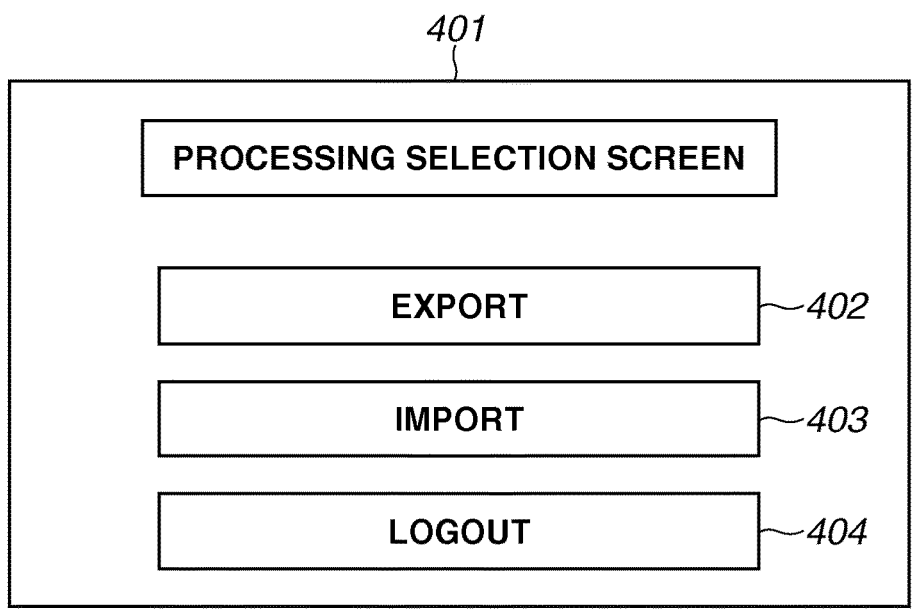
FIG. 6 illustrates an example of a processing selection screen.

In step S103, the CPU 11 displays a UI screen such as the one illustrated in FIG. 6 on the display device of the electronic apparatus 3. The UI screen is a processing selection screen 401 for selecting the processing to be executed by the image communication apparatus 1. The user can select whether to export/import the address book data or log-out via the screen. The processing selection screen 401 is displayed on the display device of the electronic apparatus 3 until any of the items is selected (NO in steps S104, S106, and S108).

In step S104, the CPU 11 determines whether an "export" button 402 on the processing selection screen 401 is selected by the user. If the "export" button 402 is selected (YES in step S104), the processing proceeds to step S105. If the "export" button 402 is not selected (NO in step S104), the processing proceeds to step S106. In step S105, the CPU 11 exports the address book data. In step S106, the CPU 11 determines whether an "import" button 403 on the processing selection screen 401 is selected by the user. If the "import" button 403 is selected (YES in step S106), the processing proceeds to step S107. If the "export" button 402 is not selected (NO in step S106), the processing proceeds to step S108. In step S107, the CPU 11 imports the address book data.

In step S108, the CPU 11 determines whether a "log-out" button 404 on the processing selection screen 401 is selected by the user. If the "log-out" button 404 is selected (YES in step S108), then the export/import processing of the address book data ends. If the "log-out" button 404 is not selected (NO in step S108), the processing returns to step S103.

Figure 7:
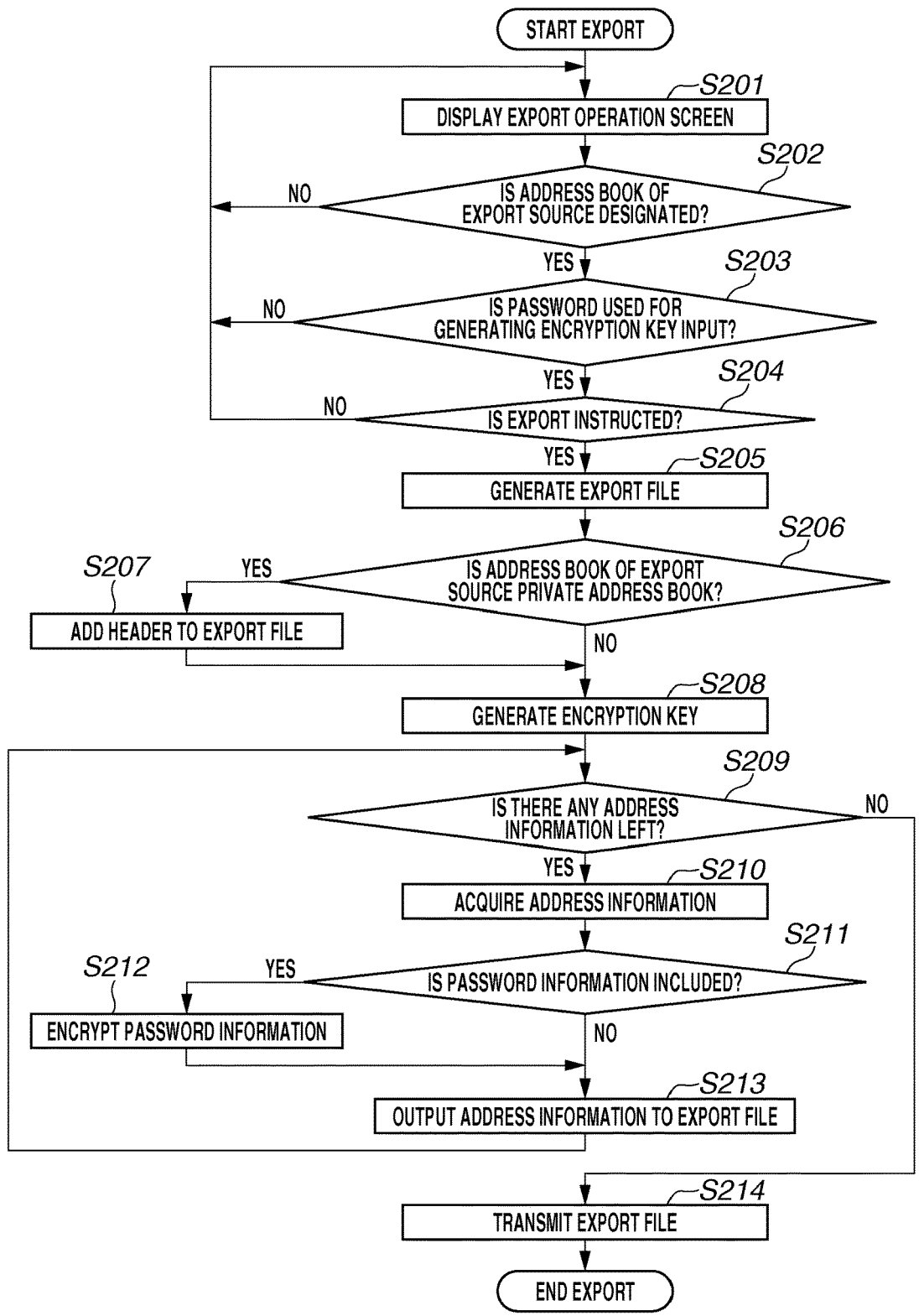
FIG. 7 is a flowchart illustrating export processing.
Figure 8:
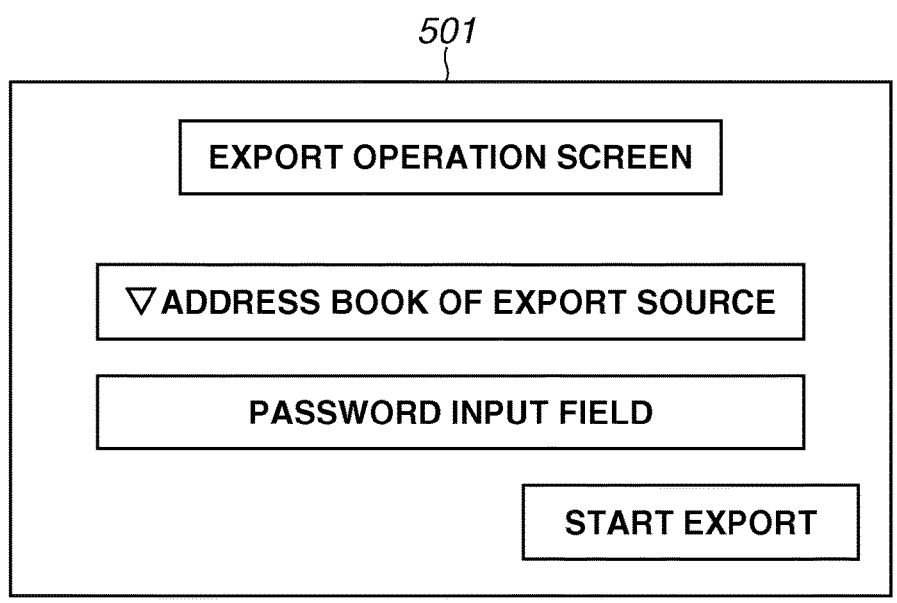
FIG. 8 illustrates an example of an export operation screen.

FIG. 7 is a flowchart illustrating the export processing. In step S201, when the export is started, the CPU 11 of the image communication apparatus 1 displays a UI screen, such as the one illustrated in FIG. 8, on the display device of the electronic apparatus 3. The UI screen is an export operation screen 501 for performing the export operation. By operating the export operation screen 501, the user designates address book data to be exported, enters a password, and submits an export start instruction.

In step S202, the CPU 11 determines whether the address book data to be exported is selected by the user via the export operation screen 501. The address book data to be exported indicates the address book data from which the address information to be exported is acquired. The user can select the address book data to be exported from a dropdown list having two options: shared address book data and private address book data. When designating the private address book data, it is possible to designate only the private address book data which can be used by the user authenticated via the authentication screen.

In step S202, if the address book data to be exported is selected (YES in step S202), the processing proceeds to step S203. If the address book data to be exported is not selected (NO in step S202), the processing returns to step S201. In step S203, the CPU 11 determines whether a password is entered in the field "password" on the export operation screen 501. This password is used for generating an encryption key for encrypting password information in the address information of the address book data to be exported. If the password information in the address information is exported without being encrypted, information leak may occur. For that reason, the CPU 11 generates an encryption key using the entered password. Further, the CPU 11 encrypts the password information in the address information using the encryption key. Accordingly, the information leak can be prevented.

In step S203, if a password is entered in the field (YES in step S203), the processing proceeds to step S204. If a password is not yet entered in the field (NO in step S203), the processing returns to step S201. In step S204, the CPU 11 determines whether the "start export" instruction is submitted on the export operation screen 501. The export operation screen 501 is displayed on the display device of the electronic apparatus 3 until the address book data to be exported is designated, the password is entered, and the start export instruction is submitted. If the start export instruction is submitted (YES in step S204), the processing proceeds to step S205. If the start export instruction is not yet submitted (NO in step S204), the processing returns to step S201. In step S205, the CPU 11 generates an export file for storing the address information in the address book data to be exported.

Figure 9:
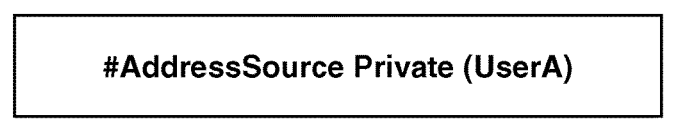

In step S206, after the export file is generated, the CPU 11 determines whether the address book data to be exported is private address book data. If the data is private address book data (YES in step S206), the processing proceeds to step S207. If the address book data of the export source is not private address book data (NO in step S206), the processing proceeds to step S208. In step S207, the CPU 11 adds, to the export file, a header which is type data indicating that the data is private address book data. FIG. 9 illustrates an example of the header.

In step S208, the CPU 11 generates an encryption key using the password entered in the field "password".

After the generation of the encryption key, the CPU 11 writes the address information, which is in the address book data to be exported, in the export file. More specifically, in step S209, the CPU 11 determines whether the address information to be exported still remains in the address book data to be exported. If the address information remains (YES in step S209), the processing proceeds to step S210. If the address information does not remain (NO in step S209), the processing proceeds to step S214. In step S210, the CPU 11 acquires the address information from the address book data to be exported. In step S211, the CPU 11 determines whether the password information is included in the acquired address information. If the password information is included (YES in step S211), the processing proceeds to step S212. If the password information is not included (NO in step S211), the processing proceeds to step S213. In step S212, the CPU 11 encodes the password information in the address information using the encryption key.

In step S213, the CPU 11 outputs the address information to the export file. More specifically, the CPU 11 outputs all address information in the address book data to be exported to the export file. In step S214, the CPU 11 transmits the export file to the electronic apparatus 3. In this manner, the address book data is exported from the image communication apparatus 1 to the electronic apparatus 3. The export file can be directly transmitted to another image communication apparatus 1 that imports the file.

Figure 10:
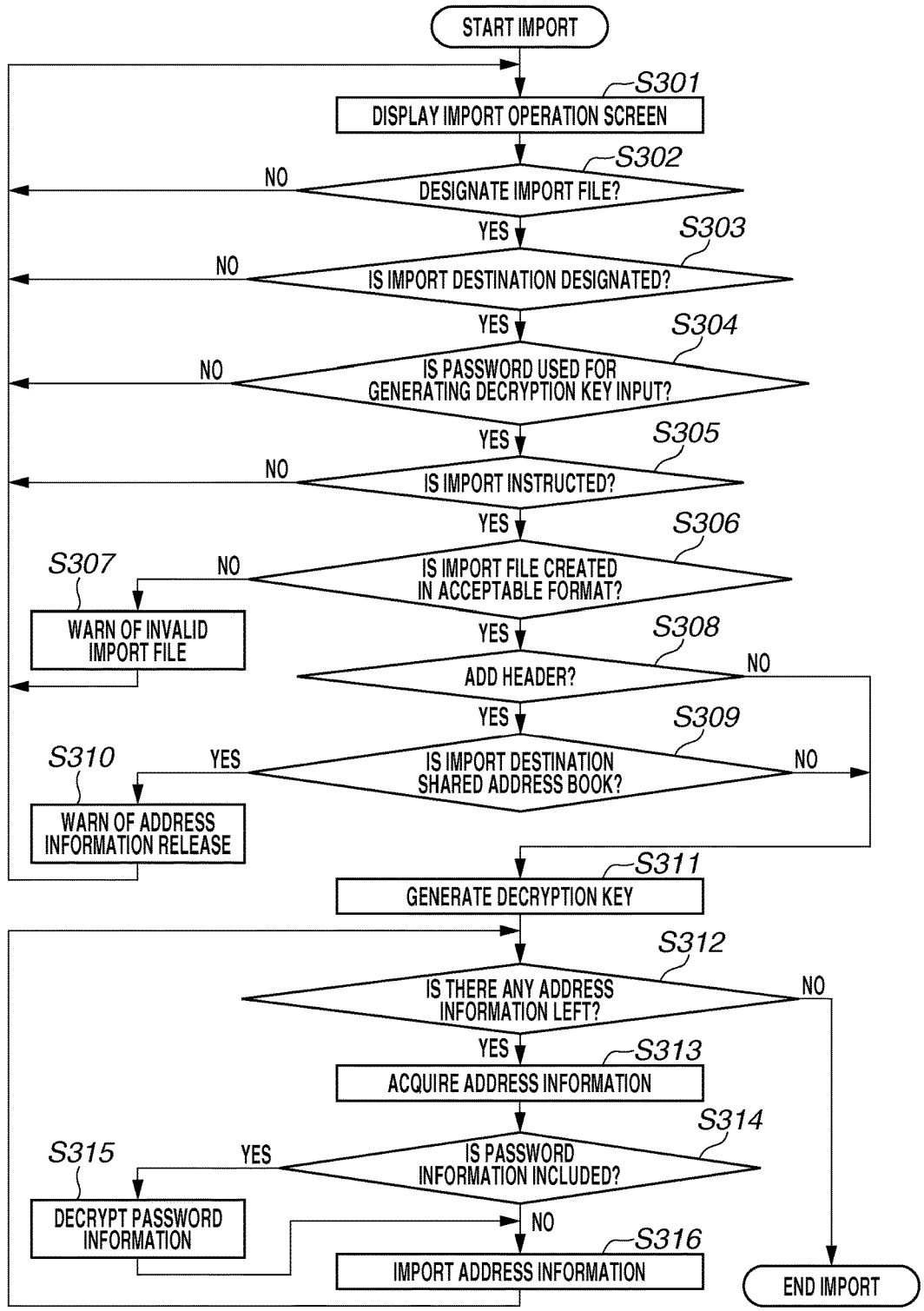
FIG. 10 is a flowchart illustrating import processing.
Figure 11:
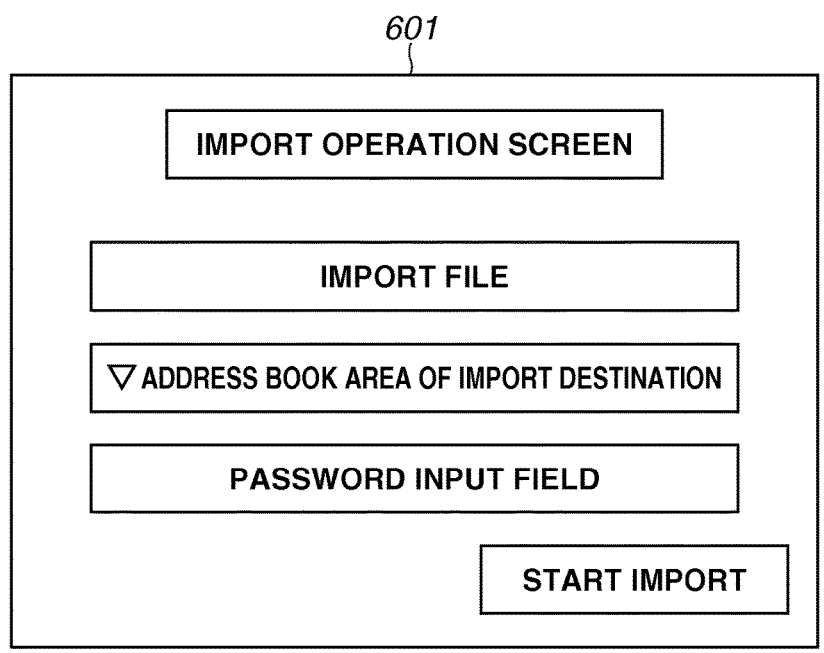
FIG. 11 illustrates an example of an import operation screen.

FIG. 10 is a flowchart illustrating the import processing. In step S301, the CPU 11 of the image communication apparatus 1 causes the display device of the electronic apparatus 3 to display a UI screen such as an import operation screen 601 illustrated in FIG. 11. The user designates the file to be imported (hereinafter referred to as an "import file"), designates the address book area 301 where the import file is to be stored, enters a password, and submits an import start instruction via the import operation screen 601. The import file is a file exported from a different image communication apparatus. The password is used for generating a decoding key for decoding the encrypted password information included in the import file.

In step S302, the CPU 11 determines whether the import file is designated by the user. If the import file is designated (YES in step S302), the processing proceeds to step S303. If the import file is not yet designated (NO in step S302), the processing returns to step S301. In step S303, the CPU 11 determines whether the address book area 301 where the import file is to be stored is designated by the user. If the address book area 301 is designated (YES in step S303), the processing proceeds to step S304. If the address book area 301 is not yet designated (NO in step S303), the processing returns to step S301. In step S304, the CPU 11 determines whether the password for generating the decoding key is entered by the user. If the password is entered (YES in step S304), the processing proceeds to step S304. If the password is not yet entered (NO in step S304), the processing returns to step S301. In step S305, the CPU 11 determines whether the "start import" instruction is submitted on the export operation screen 601 by the user. If the start import instruction is submitted (YES in step S305), the processing proceeds to step S306. If the start import instruction is not yet submitted (NO in step S305), the processing returns to step S301.

In step S306, the CPU 11 acquires the import file from the electronic apparatus 3 and determines whether the import file is created in an acceptable form by the image communication apparatus 1. If the import file is not created in an acceptable form (NO in step S306), the processing proceeds to step S307. In step S307, the CPU 11 displays a warning message informing the user that the import file designated on the import operation screen 601 is based on an invalid file format. Then, the processing returns to step S301.

In step S306, if the import file is acceptable by the image communication apparatus 1 (YES in step S306), the processing proceeds to step S308. In step S308, the CPU 11 determines whether the header indicating that the address information in the import file corresponds to private address book data is added to the import file.

If the header is added to the import file (YES in step S308), the processing proceeds to step S309. If the header is not added to the import file (NO in step S308), the processing proceeds to step S311. In step S309, the CPU 11 determines whether the address book area 301 where the import file is to be stored is set to be the shared address book area 302. If the address book area 301 where the import file is to be stored is set to be the shared address book area 302 (YES in step S309), the processing proceeds to step S310. If the address book area 301 where the import file is to be stored is not set to be the shared address book area 302 (NO in step S309), the processing proceeds to step S311. In step S310, the CPU 11 displays a warning message informing the user that the address information exported from the private address book area 303 will be stored in the shared address book area 302 and disclosed. After the warning message is displayed, the processing returns to step S301.

In step S311, the CPU 11 generates a decoding key using the password input in step S304.

After the decoding key is generated, the CPU 11 writes the address information, which is included in the import file, in the address book area 301 where the import file is to be stored. In step S312, the CPU 11 determines whether address information to be imported remains in the import file. If address information remains in the import file (YES in step S312), the processing proceeds to step S313. In step S313, the CPU 11 acquires the address information from the import file. In step S314, the CPU 11 determines whether password information is included in the acquired address information. If password information is included (YES in step S314), the processing proceeds to step S315. If password information is not included (NO in step S314), the processing proceeds to step S316. In step S315, the CPU 11 decodes the password information in the address information using the decoding key. Then, the processing proceeds to step S316.

In step S316, the CPU 11 writes the address information in the designated address book area 301 where the import file is to be stored. Then, the processing returns to step S312.

In step S312, if address information no longer remains in the import file (NO in step S312), then the import processing ends.

As described above, if the address book data to be imported is the private address book data, a warning message is displayed so as not to store the private address book data in the shared address book area 302. Accordingly, it is possible to prevent the address information from being disclosed. Further, since the password information is encrypted and decrypted using the password, it is possible to prevent the password information from being disclosed when it is exported/imported.

Figure 12:
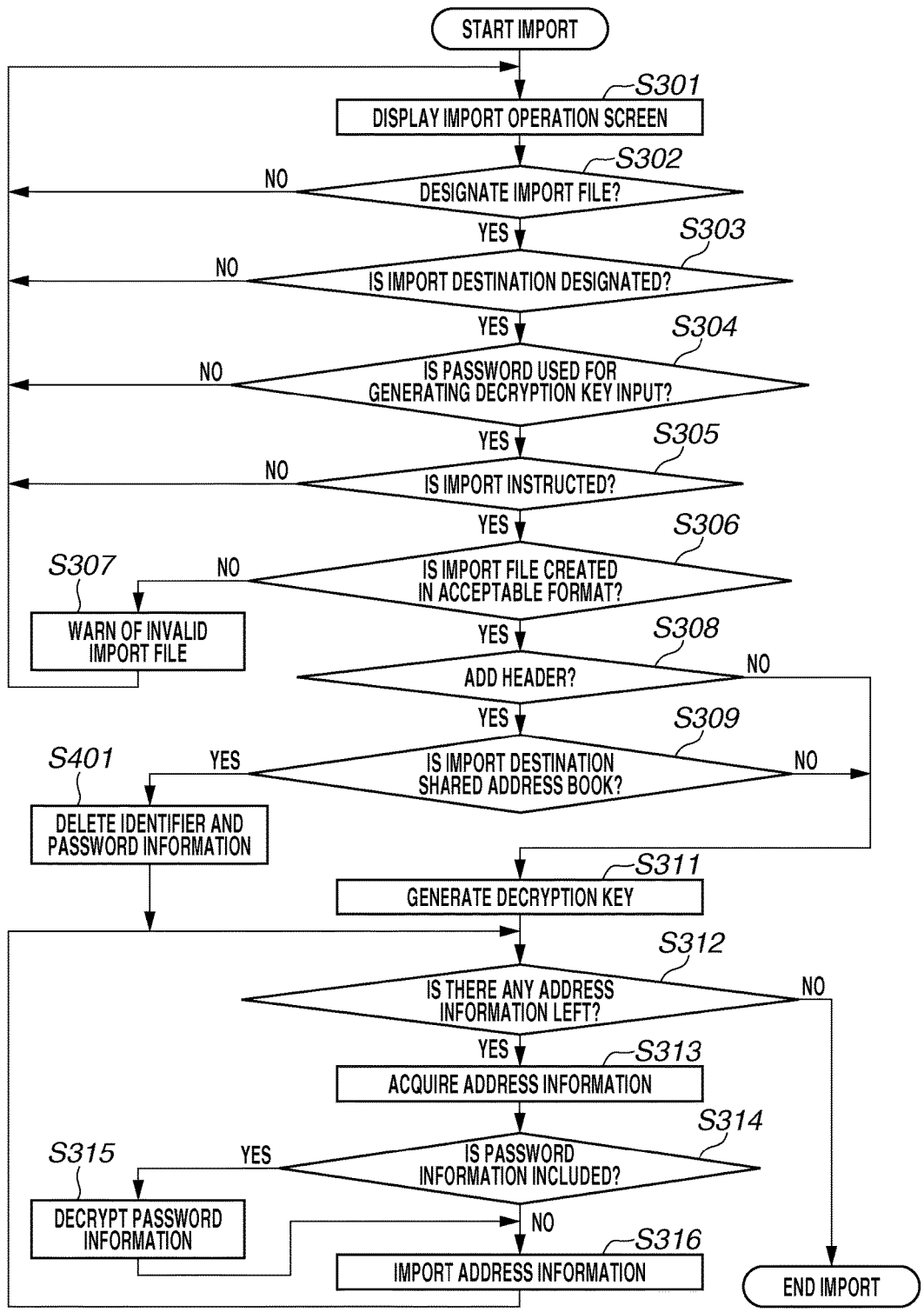
FIG. 12 is a flowchart illustrating import processing.

FIG. 12 is a flowchart illustrating the import processing according to the second exemplary embodiment. The second exemplary embodiment is different from the first exemplary embodiment in that the address information of the import file is exported from the private address book data and the area where the import file is to be stored is the shared address book area 302. As for the configuration of the image communication apparatus 1 and other processing, since they are similar to those of the first exemplary embodiment, their description is not repeated.

In step S309, if the area where the import file is to be stored is the shared address book area 302 (YES in step S309), the processing proceeds to step S401. In step S401, the CPU 11 of the image communication apparatus 1 deletes the identifier and the password information in the address information of the import file. After the identifier and the password information are deleted, the CPU 11 writes the address information, which is included in the import file, in the shared address book area 302 of the area where the import file is to be stored.

According to the second exemplary embodiment, when the shared address book area 302 is designated as the area where the import file is to be stored, the identifier and the password information in the address information will be deleted, and thus such information is not disclosed.

Figure 13:
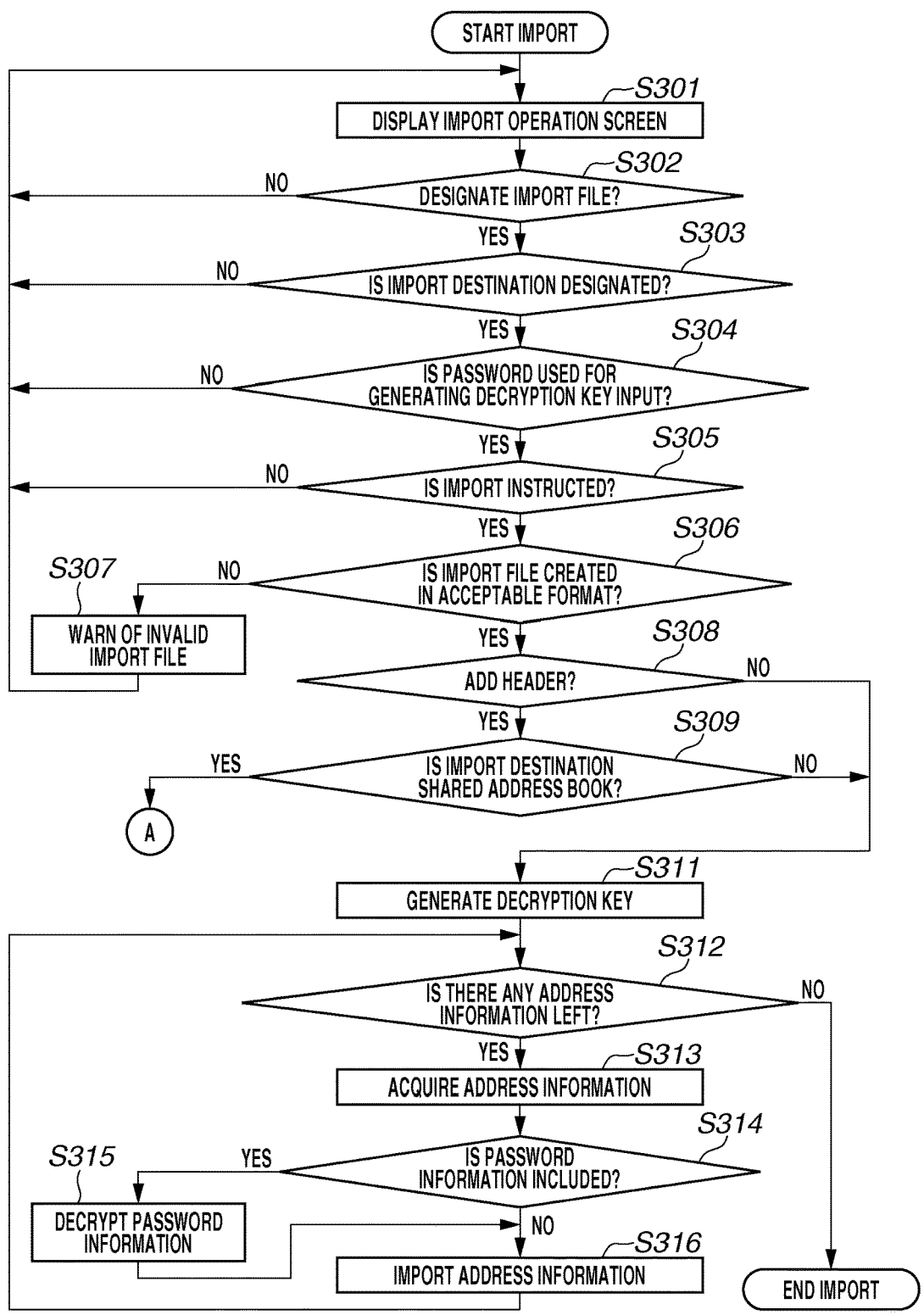
FIG. 13 is a flowchart illustrating import processing.
Figure 14:
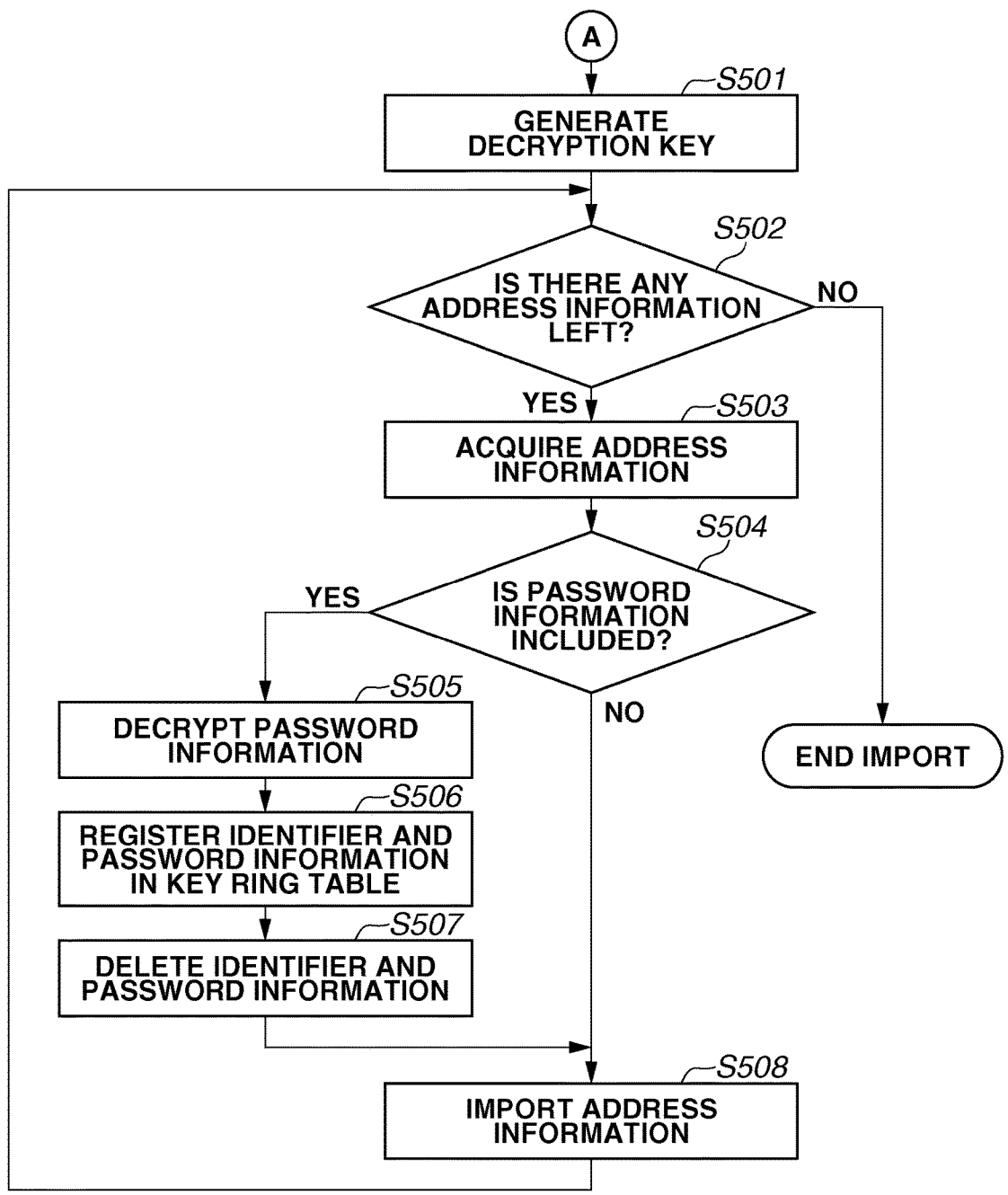
FIG. 14 is another flowchart illustrating import processing.

FIGS. 13 and 14 are flowcharts illustrating the import processing according to the third exemplary embodiment. The third exemplary embodiment is different from the first exemplary embodiment in that the address information of the import file is exported from the private address book data and the area where the import file is to be stored is the shared address book area 302. As for the configuration of the image communication apparatus 1 and other processing, since they are similar to those of the first exemplary embodiment, their description is not repeated.

According to the third exemplary embodiment, the identifier and the password information included in the address information of an import file is stored in a table of the storage unit 13 (hereinafter referred to as a "key ring table"). FIG. 15 illustrates an example of the key ring table. The CPU 11 extracts the identifier and the password information from the address information including the identifier and the password information and stores them in a key ring table by correlating the extracted identifier and password information to the address information.

According to the example in FIG. 15, the address information is information that identifies an electronic apparatus as a communication target. The identifier is information for identifying the user by the electronic apparatus. The password information is authentication information for authenticating the user by the electronic apparatus. An ID as a user identifier for identifying the user by the image communication apparatus 1 is correlated to the key ring table. According to the example in FIG. 15, the ID is "user 1". Only the user of this ID can use the key ring table. This ID is same as the one input via the authentication screen in FIG. 5.

In step S309 in FIG. 13, if the area where the import file is to be stored is the shared address book area 302 (YES in step S309), the processing proceeds to step S501 in FIG. 14. In step S504, the CPU 11 generates a decryption key for decrypting the password information using the password input in step S304. After the generation of the decryption key, the CPU 11 writes the address information, which is included in the import file, in the shared address book area 302 of the area where the import file is to be stored. In step S502, the CPU 11 determines whether address information to be imported still remains in the import file. If such address information remains (YES in step S502), the processing proceeds to step S503. If such address information does not remain (NO in step S502), then the processing ends. In step S503, the CPU 11 acquires the address information from the import file.

In step S504, the CPU 11 determines whether the password information is included in the acquired address information. If the password information is included (YES in step S504), the processing proceeds to step S505. If the password information is not included (NO in step S504), the processing proceeds to step S508. In step S505, the CPU 11 decrypts the password information in the address information using the decryption key. In step S506, the CPU 11 registers the identifier and the password information in the key ring table after correlating them to the address information. In step S507, the CPU 11 deletes the identifier and the password information from the address information. Then, the processing proceeds to step S508.

In step S508, the CPU 11 writes the designated address information in the shared address book area 302. When the CPU finishes writing all address information, which is included in the import file, in the shared address book area 302, the processing ends.

According to the third exemplary embodiment, since the identifier and the password information in the address information are deleted, the information is not disclosed. Further, all identifiers and password information included in the import file are registered in the key ring table. Since the key ring table can be referenced only by the authenticated user, the identifier and the password information are not disclosed to other users.

Figure 16:
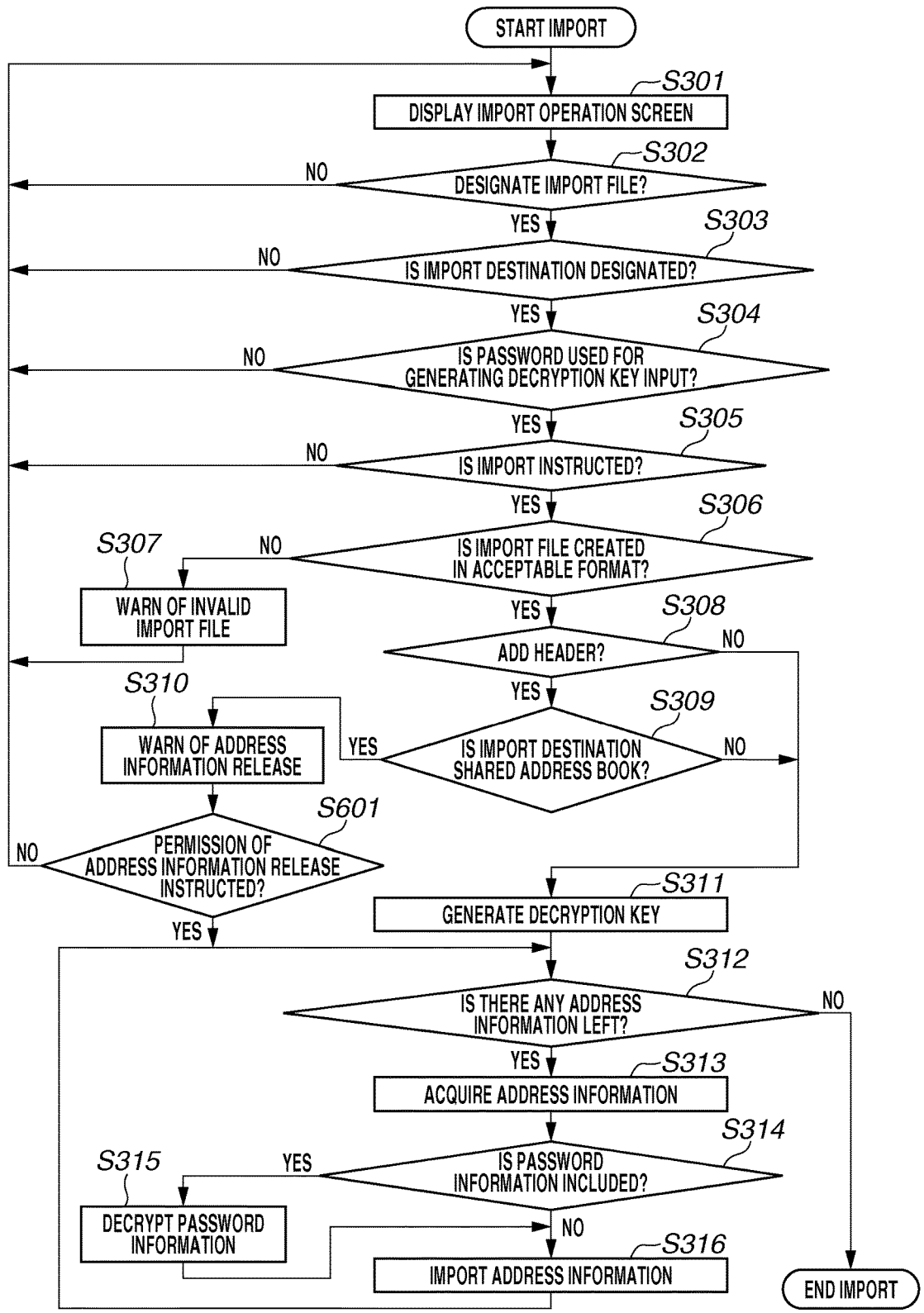
FIG. 16 is a flowchart illustrating import processing.

FIG. 16 is a flowchart illustrating the import processing according to the fourth exemplary embodiment. The fourth exemplary embodiment is different from the first exemplary embodiment in that after displaying the warning message informing the user that the address information may be disclosed, the address information is imported with the consent of the user. As for the configuration of the image communication apparatus 1 and other processing, since they are similar to those of the first exemplary embodiment, their description is not repeated.

In step S309, if the address book area 301 where the import file is to be stored is the shared address book area 302 (YES in step S309), the processing proceeds to step S310. In step S310, the CPU 11 displays a warning message, on the import operation screen 601, informing the user that the address information may be disclosed.

Figure 17:
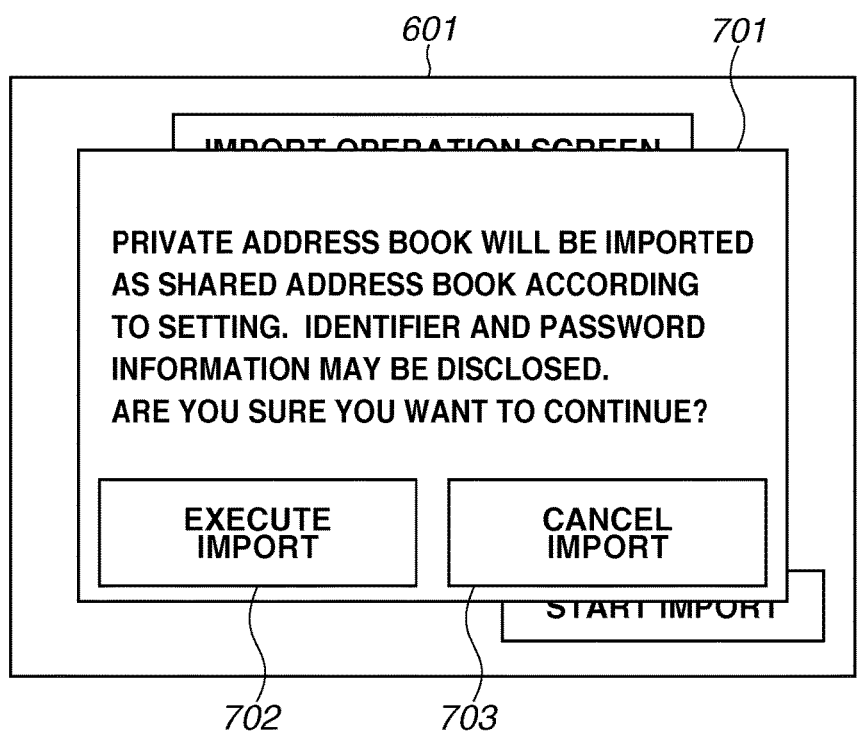
FIG. 17 illustrates an example of a warning message.

An example of the message displayed by the CPU 11 on the import operation screen 601 is illustrated in FIG. 17. The CPU 11 displays the warning message 701 to determine whether the user is willing to continue the import operation while warning the user of the possibility that the identifier and the password information may be disclosed. An "execute import" button 702 and a "cancel import" button 703 are provided with the warning message 701. In step S601, the CPU 11 determines whether the "execute import" button 702 is selected by the user. If the "execute import" button 702 is selected (YES in step S601), the processing proceeds to step S312 and the CPU 11 imports the address information since the user has permitted the disclosure of the address information.

On the other hand, in step S601, if the "cancel import" button 703 is selected (NO in step S601), the CPU 11 determines that the user did not permit the disclosure of the address information, and the processing returns to step S301.

According to the fourth exemplary embodiment, the address information is disclosed only when the user permits the disclosure of the address information. According to the consent of the user, address information can be flexibly imported.

According to the present invention, if the import of the private data to the shared area is instructed, a warning message informing the user that the private data will be shared is displayed. Thus, it is possible to prevent the private data from being disclosed and shared by unspecified users by mistake.

According to the above-described exemplary embodiment, although the image communication apparatus 1 is described as an apparatus including a scanner function, a network communication function, and a fax machine function, it can be an apparatus including functions such as a print function and a copy function. Further, the present invention is also applicable to an image communication apparatus including not all of such functions.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-075963 filed Apr. 1, 2013, which is hereby incorporated by reference herein in its entirety.

What is claimed is:

1. A data distribution system including an export apparatus and an import apparatus, the export apparatus comprising:
   a first memory device that stores a set of instructions; and
   at least one processor that executes the instructions in the first memory device to:
   generate a first export file including private data individually used by a user of the export apparatus and having added type data indicating the private data is included;
   generate a second export file including shared data shared among a plurality of users of the export apparatus and not including the private data, and
   externally output the first export file or the second export file, the import apparatus comprising:
      a storage unit including a shared area which is a storage area of data shared among the plurality of users and a private area which is a storage area of data individually provided for the user;
   a second memory device that stores a set of instructions; and
   at least one processor that executes the instructions in the second memory device to:
      input a file via a user interface which the import apparatus provides to an electronic apparatus by using a hypertext transfer protocol;
      accept designation of an import destination of the input file via the user interface,
      determine whether the input file is the first export file including the private data according to the type data added to the input file;
      write the private data included in the input file in the private area if it is determined that the input file is the first export file and the private area is designated as the import destination of the input file,
      write the shared data included in the input file in the shared area if the input file is the second export file in which the type data has not been added and the shared area is designated as the import destination of the input file, and
      display a warning message via the user interface without writing the private data included in the input file in the shared area if it is determined that the input file is the first export file and the shared area is designated as the import destination of the input file.

2. The data distribution system according to claim 1, wherein the private data is address data individually used by a user of the export apparatus and the shared data is address data shared among the plurality of users.

3. The data distribution system according to claim 1, wherein the type data is added to the first file as a file header.

4. A control method for a data distribution system including an export apparatus and an import apparatus which includes a storage unit including a shared area which is a storage area of data shared among a plurality of users and a private area which is a storage area of data individually provided for each user, the control method comprising:
   generating, in the export apparatus, a first export file including private data individually used by a user of the export apparatus and having added type data indicating the private data is included;
   generating, in the export apparatus, a second export file including shared data shared among a plurality of users of the export apparatus and not including the private data,
   externally outputting, in the export apparatus, the first export file or the second export file,
   inputting, in the import apparatus, a file via a user interface which the import apparatus provides to an electronic apparatus by using a hypertext transfer protocol;
   accepting, in the import apparatus, designation of an import destination of the input file via the user interface,
   determining, in the import apparatus, whether the input file is the first export file including the private data according to the type data added to the input file;
   writing, in the import apparatus, the private data included in the input file in the private area if it is determined that the input file is the first export file and the private area is designated as the import destination of the input file,
   writing, in the import apparatus, the shared data included in the input file in the shared area if the input file is the second export file in which the type data has not been added and the shared area is designated as the import destination of the input file, and
   displaying, in the import apparatus, a warning message via the user interface without writing the private data included in the input file in the shared area if it is determined that the input file is the first export file and the shared area is designated as the import destination of the input file.

5. An import apparatus comprising:
   a storage unit including a shared area which is a storage area of data shared among a plurality of users and a private area which is a storage area of data individually provided for each user;
   a memory device that stores a set of instructions; and
   at least one processor that executes the instructions to:
   input a file via a user interface which the import apparatus provides to an electronic apparatus by using a hypertext transfer protocol;
   accept designation of an import destination of the input file via the user interface,
   determine whether the input file is a first export file including private data according to type data added to the input file, wherein the type data indicates the private data;
   write the private data included in the input file in the private area if it is determined that the input file is the first export file and the private area is designated as the import destination of the input file,
   write shared data included in the input file in the shared area if the input file is a second export file in which the type data has not been added and the shared area is designated as the import destination of the input file, and
   display a warning message via the user interface without writing the private data included in the input file in the shared area if it is determined that the input file is the first export file and the shared area is designated as the import destination of the input file.

6. A non-transitory computer readable storage medium storing a program causing a computer having a storage unit including a shared area which is a storage area of data shared among a plurality of users and a private area which is a storage area of data individually provided for each user, to execute a method comprising:
   inputting a file via a user interface which the import apparatus provides to an electronic apparatus by using a hypertext transfer protocol;
   accepting designation of an import destination of the input file via the user interface, determining whether the input file is a first export file including private data according to type data added to the input file, wherein the type data indicates the private data;

writing the private data included in the input file in the private area if it is determined that the input file is the first export file and the private area is designated as the import destination of the input file, writing shared data included in the input file in the shared area if the input file is a second export file in which the type data has not been added and the shared area is designated as the import destination of the input file, and displaying a warning message via the user interface without writing the private data included in the input file in the shared area if it is determined that the input file is the first export file and the shared area is designated as the import destination of the input file.

\* \* \* \* \*